D. L. HOLDEN & E. W. BYRN.
Refrigerating and Air Cooling Apparatus.

No. 209,892.  Patented Nov. 12, 1878.

WITNESSES:
W. W. Hollingsworth
Colon C. Kenion

INVENTOR:
D. L. Holden
Edward W. Byrn
BY
ATTORNEYS.

UNITED STATES PATENT OFFICE.

DANIEL L. HOLDEN, OF PHILADELPHIA, PA., AND EDWARD W. BYRN, OF WASHINGTON, D. C.; SAID BYRN ASSIGNOR TO SAID HOLDEN.

IMPROVEMENT IN REFRIGERATING AND AIR-COOLING APPARATUS.

Specification forming part of Letters Patent No. 209,892, dated November 12, 1878; application filed May 14, 1878.

*To all whom it may concern:*

Be it known that we, DANIEL L. HOLDEN, of the city and county of Philadelphia and State of Pennsylvania, and EDWARD W. BYRN, of Washington city, District of Columbia, have invented a new and Improved Refrigerating Apparatus; and we do hereby declare that the following is a full, clear, and exact description of the same, reference being had to the accompanying drawing, forming part of this specification, in which—

Figure 1:
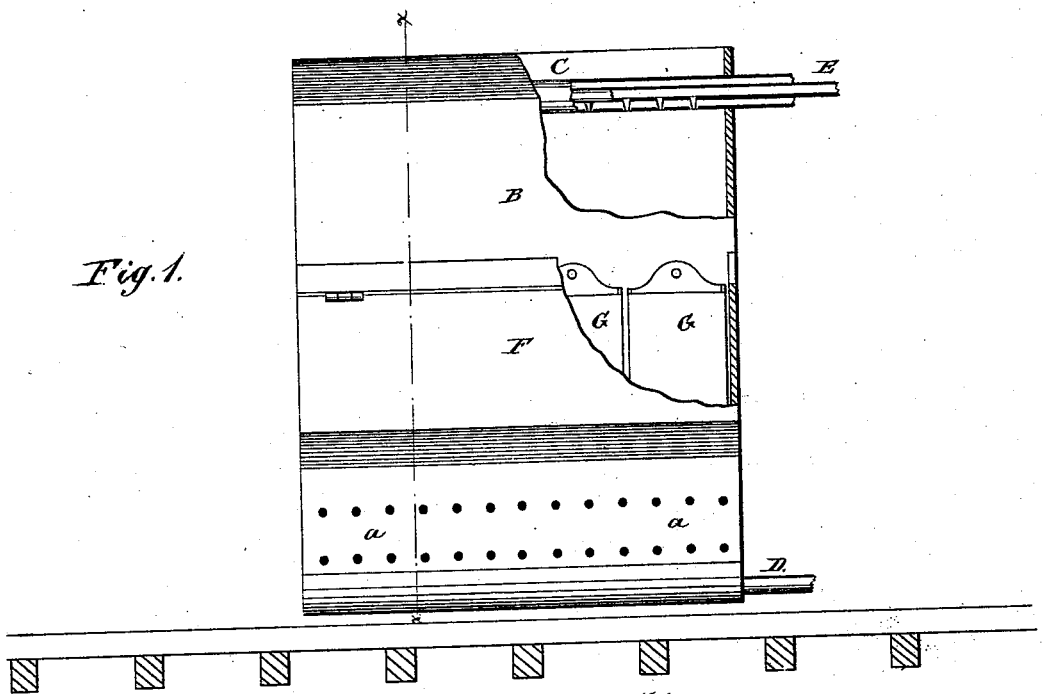
Figure 2:
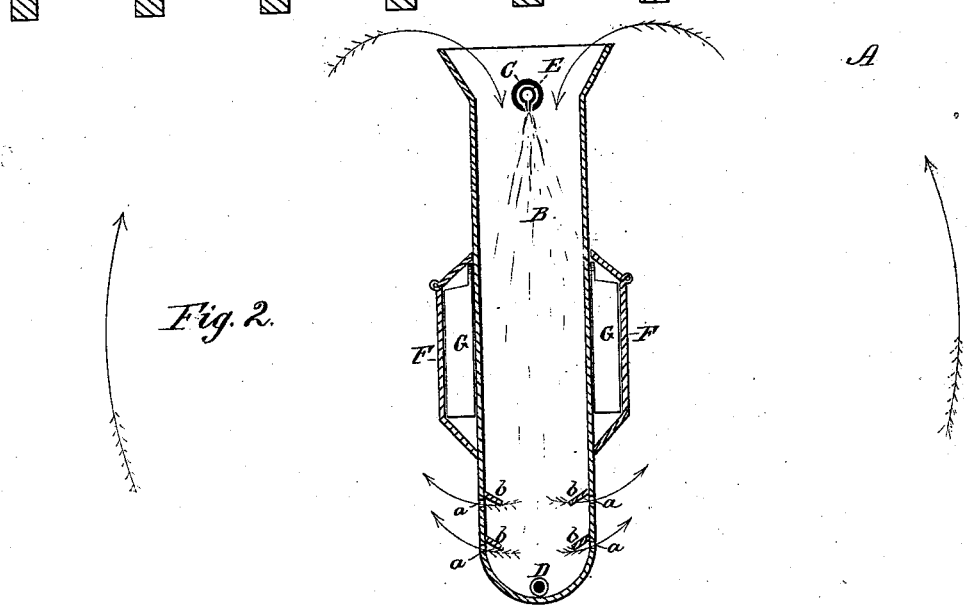

Figure 1 is a side view of the apparatus with parts broken away. Fig. 2 is a vertical section through line $xx$ of Fig. 1, shown arranged in a compartment of a ship or building in which the air is to be cooled.

This invention relates to a refrigerating apparatus for cooling the air in a room or compartment in which meats or other perishable food are stored. The invention is designed to operate in conjunction with an apparatus for refrigerating a non-congealable fluid which is employed as a vehicle for the cold, and which is made to chill the air by being sprayed in contact with the same.

The invention consists in a walled receptacle having an open upper end, with a spray-pipe located at this point, and having lateral openings below, covered by deflectors, so that the cold liquid, in being sprayed into the walled receptacle, induces a current of air from the room or compartment, which, in passing down the walled receptacle, is concentrated into and cooled by the falling spray, which spray is collected in the bottom of the receptacle, and is returned to the point of refrigeration, while the cooled air issues from lateral openings into the lower portion of the room, the deflectors serving to effect the separation of the spray from the cool air, all as hereinafter more fully described.

In the drawing, A represents a closed compartment of a ship, a store-room, or other place where meats or provisions are to be kept. B is the receptacle for receiving the sprayed or atomized liquid, which opens at the top with a flared mouth, near the upper portion of the room, has a trough-shaped bottom, and just above the bottom has outlet-openings $a$. In the open mouth of the receptacle is arranged a pipe, C, leading from the reservoir of the non-congealable liquid, which is refrigerated at another place by an independent apparatus. In the bottom portion of this pipe are formed numerous nozzles, perforations, or orifices, through which the cold non-congealable liquid is forced under pressure down into the receptacle in the form of sprays or jets. These sprays, it will be seen, in passing into the receptacle, induce through its open flared top currents of air from the room, which pass down with the spray into the receptacle, and, after being cooled by the same, issue through the openings $a$ into the room again, thus producing a constant circulation of currents around the room and through the receptacle. As the spray descends into the receptacle it is prevented from passing out the openings $a$ by inclined sheds or deflectors $b$ arranged above the holes, and it accumulates in the trough-shaped bottom of the receptacle, and is run off by means of a pipe, D, to the place where the liquid is again refrigerated.

To increase the useful effect of the spray and secure a more positive circulation of the air in the room, a pipe, E, is arranged concentrically within the non-congealable fluid-pipe C, and nozzles from the said pipe E are arranged to register with the orifices of the pipe C, through which the cold liquid issues. Through this inner pipe and its nozzles is forced a blast of cold air, taken preferably from the room to be cooled, which blasts, in issuing from the pipe into the receptacle simultaneously and in contact with the jets of cold liquid, serve not only to comminute and atomize the same and secure a more intimate contact of the same with the induced currents, but it also induces a stronger and more positive circulation in the room, thus rendering a blower unnecessary for this purpose.

As the cooling effect upon the receptacle B will be very great, the said receptacle may be employed for making ice, which will be a great convenience, especially upon ship-board. For this purpose the receptacle is formed with pockets or troughs F F, having hinged covers, in which pockets are arranged cans G, which are filled with water and quickly frozen, so that when ice is needed one of the cans is relieved of its block of ice and again filled with water. These pockets and cans not only serve this purpose, but they act as a reservoir of cold to maintain the temperature of the room if the action of the refrigerating apparatus (not shown) should be discontinued for any reason.

We are aware of the patent to S. D. Lount, granted March 28, 1876, in which is shown a receptacle within which sprays of a cold non-congealable liquid are allowed to fall through the air in the receptacle to cool it. In that case, however, the sprays are not showered down forcibly, but fall in perpendicular streams, and the blast is not concentrated by closely approaching walls. The result of this is that, in order to produce a current of sufficient intensity a fan-blower is required to be used in connection with said process.

We are aware also of the construction of the "trombe" and "Catalan forge," in which a blast of air is induced by a falling stream of water passing through the opened upper end of a walled receptacle. In these devices, however, there are no lateral openings covered by deflectors for effecting the separation of the air from the sprayed liquid. We therefore claim only a walled receptacle, having its upper end open and provided with a spray-pipe, and its bottom portion perforated with lateral openings and provided upon the inside with sheds or deflectors, as shown and described.

Having thus described our invention, what we claim as new is—

1. The walled receptacle B, having at the top an open upper end, provided with a spray-pipe, and lateral openings at the bottom, shielded by deflectors upon the inside, substantially as and for the purpose described.

2. In combination with the receptacle B, constructed as described, the pockets F, located upon the sides of said receptacle for the formation of ice, substantially as described.

3. The receptacle B, having an open top and a trough-shaped bottom, with side openings covered by deflectors, in combination with the two concentrically-arranged pipes having registering outlet-orifices for the air and liquid, substantially as and for the purpose described.

D. L. HOLDEN.
    EDW. W. BYRN.

Witnesses:
  SOLON C. KEMON,
  CHAS. A. PETTIT.